2,872,451
DIHYDRORESCINNAMINE AND METHODS OF MAKING THE SAME

Hans Merz and Hans Weidlich, Ingelheim (Rhine), Germany, assignors to C. H. Boehringer Sohn, Ingelheim (Rhine), Germany, a partnership of Germany No Drawing. Application September 4, 1957
Serial No. 681,881

Claims priority, application Germany September 14, 1956

1 Claim. (Cl. 260—287)

This invention relates to a novel derivative of the rauwolfia alkaloid rescinnamine, and more particularly to dihydrorescinnamine and various methods of making the same.

It is well known that rauwolfia contains the weak bases reserpine and rescinnamine. These alkaloids have found widespread therapeutic use as sedative and blood pressure-reducing agents (Goodman and Gilman, The Pharmacological Basis of Therapeutics, second edition (1956), pages 754–756). However, while reserpine and rescinnamine possess high sedative and hypotensive properties, they also exhibit substantial toxicity and strong undesirable side-effects in the intestinal tract (Goodman and Gilman, supra, page 755). Moreover, both alkaloids are esters which are somewhat sensitive and relatively unstable because of their ready capability of being saponified.

It is an object of the present invention to provide a hydrogenated rescinnamine derivative which is substantially less toxic than reserpine or rescinnamine and exhibits practically no undesirable side effects.

Another object of the present invention is to provide various methods of producing dihydrorescinnamine.

Still other objects and advantages of the present invention will become apparent as the description proceeds.

We have found that dihydrorescinnamine, wherein the double bond of the trimethoxycinnamic acid moiety of rescinnamine has been saturated by hydrogenation, possesses particularly valuable therapeutic properties. Thus, we have discovered that dihydrorescinnamine shows substantially the same or only slightly less sedative activity than reserpine or rescinnamine, while its hypotensive, i. e. blood pressure-reducing, activity is greater than that of the known rauwolfia alkaloids. At the same time, dihydrorescinnamine is substantially less toxic than reserpine and rescinnamine and is practically free from undesirable side effects. Moreover, dihydrorescinnamine exhibits a greater resistance against saponification and is considerably more readily soluble than reserpine and the unsaturated parent compound.

Solutions of dihydrorescinnamine in water weakly acidified with acetic acid, formic acid or tartaric acid are stable and do not tend to reprecipitate the solute.

Consequently, dihydrorescinnamine has all the attributes of a novel improved sedative and hypotensive therapeutic agent.

Dihydrorescinnamine has the empirical formula $C_{35}H_{44}N_2O_9$, and may be represented by the structural formula

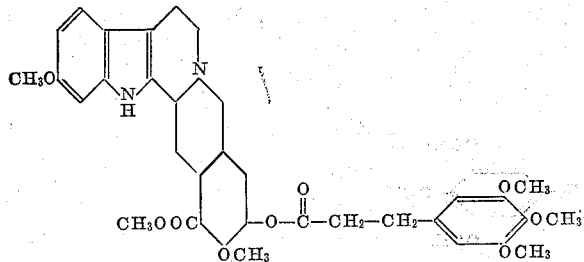

and melts at 176–177° C. accompanied by a yellow discoloration. It crystallizes in the form of colorless, fine needles and is readily soluble in acetone and chloroform, while being difficultly soluble in ether or cold isopropanol; it is completely insoluble in water or petroleum ether.

In chloroform solution, dihydrorescinnamine has an optical rotation $[\alpha]_D^{22} = -78°$. In concentrated sulfuric acid the hydrogenated rescinnamine compound according to the present invention dissolves to form a yellowish-orange solution. Similar to rescinnamine, dihydrorescinnamine undergoes a color change from yellow to green to blue when added to Froehde's reagent, and upon heating it with vanillin and a 50% aqueous sulfuric acid solution, the mixture turns reddish-violet.

The ultra-violet spectrum of dihydrorescinnamine is characterized by the following bands:

| | | |
|---|---|---|
| $\lambda_{max}$ 269.5 m$\mu$ | $\epsilon = 6250$ | log $\epsilon = 3.796$ |
| $\lambda_{max}$ 297.5 m$\mu$ | $\epsilon = 6860$ | log $\epsilon = 3.837$ |
| $\lambda_{min}$ 253 m$\mu$ | $\epsilon = 4650$ | log $\epsilon = 3.668$ |
| $\lambda_{min}$ 282.5 m$\mu$ | $\epsilon = 4720$ | log $\epsilon = 3.674$ |

With acids, dihydrorescinnamine forms well-crystallized, stable salts, such as the hydrochloride which crystallizes from alcohol and ether in the form of beautiful needles having a melting point of 182–190° C. accompanied by foaming and decomposition. The oxalate, which crystallizes from methanol, has a melting point of 222–223° C. (decomposition).

Dihydrorescinnamine may be produced by various methods, for example by hydrogenation of the olefinic double bond in rescinnamine. For this purpose, rescinnamine is preferably catalytically hydrogenated at substantially room temperature in the presence of noble metal catalysts, or at elevated temperatures in the presence of Raney-nickel as a catalyst. The hydrogenation may be carried out at substantially atmospheric pressure, but it is preferred to hydrogenate the starting material at elevated pressure, for example at 5 atmospheres gauge.

Dihydrorescinnamine may, however, also be produced by partial synthesis, for example by esterifying reserpic acid methyl ester with dihydro-trimethoxy-cinnamic acid. A preferred synthesis, however, comprises reacting reserpic acid methyl ester with 3,4,5-trimethoxy-phenylpropionylchloride in the presence of anhydrous pyridine. The 3,4,5-trimethoxy-phenylpropionylchloride in turn may be produced in accordance with well known procedures, for example from trimethoxy-cinnamic acid by hydrogenation and subsequent transformation of the hydrogenated product into the corresponding acid chloride with the aid of thionylchloride.

The following examples will further illustrate the present invention and enable others skilled in the art to understand the same more completely. It will be understood, however, that our invention is not limited to the particular examples given below.

Example I 50 gm. rescinnamine were dissolved in 500 cc. methanol containing 20 cc. glacial acetic acid, and the resulting solution was hydrogenated at a pressure of 5 atmospheres gauge and a temperature of 20° C. in the presence of 1 gm. platinum oxide as a hydrogenation catalyst. After about half an hour, 1 mol of hydrogen had been absorbed and the hydrogenation had gone to completion. Thereafter, the solution was separated from the catalyst and worked up in accordance with customary methods. The hydrogenated free base, that is dihydrorescinnamine, was recrystallized from methanol or isopropanol and was obtained in the form of fine needles having a melting point of 176–177° C. The yield was 90% of theory.

*Analysis.*—$C_{35}H_{44}N_2O_9$. Calculated: C=66.1%; H=6.93%; N=4.40%; $CH_3O$=29.2%. Found: C=65.45%; H=7.00%; N=4.20%; $CH_3O$=28.53%.

Example II 50 gm. rescinnamine were suspended in 500 cc. methanol and the suspension was hydrogenated at 5 atmospheres gauge and 50° C. in the presence of Raney-nickel as a hydrogenation catalyst. The hydrogenation had gone to completion after about 30 minutes, as indicated by the consumption of 1 mol of hydrogen. The entire suspended matter had gone into solution. After separating the catalyst from the solution, the dihydrorescinnamine was separated by evaporating the methanol solution to dryness and recrystallizing the residue from isopropanol. The yield was 96% of theory.

Eaxmple III

A solution of 5 gm. reserpic acid methyl ester in 150 cc. anhydrous pyridine was admixed with 15 gm. 3,4,5-trimethoxy-phenyl-propionylchloride and the resulting mixture was shaken for about two days. It was then poured onto 250 gm. ice and undissolved material was filtered off. The filtrate was evaporated to dryness in vacuo. The residue was dissolved in ethyl acetate, washed successively with a 2% aqueous hydrochloric acid solution, a 2% aqueous potassium hydroxide solution, again with a 2% aqueous hydrochloric acid solution and finally with water. The resulting solution was then evaporated to dryness. The residue was dissolved in benzene and chromatographically absorbed in basic aluminum oxide in the presence of benzene and benzene-acetone mixtures. After purification by recrystallization from isopropanol, dihydrorescinnamine having a melting point of 176° C. was obtained. The yield was 52% of theory.

Example IV 50 gm. rescinnamine were suspended in 1 liter ethanol and the resulting suspension was catalytically hydrogenated at 20° C. and 5 atmospheres gauge in the presence of Raney-nickel as a catalyst. After about 2½ hours the theoretical amount of hydrogen had been absorbed and the hydrogenation had gone to completion. The suspension was then heated until all the dihydrorescinnamine was dissolved and filtered to remove the catalyst, and the filtrate was crystallized by vacuum evaporation. The yield of crude dihydrorescinnamine was 92% of the theory. For purification, the crude product was recrystallized from 6 parts by volume ethanol.

For therapeutic purposes, the hydrogenated rescinnamine compound according to the present invention may be administered orally or parenterally. Solutions of dihydrorescinnamine may be injected intravenously as well as intramuscularly. The range of effective dosage is from 0.25 mg. to 0.75 mg. per administration. The preferred dosage, however, is about 0.5 mg., either in the form of tablets or from ampules.

While we have illustrated our invention with the aid of specific embodiments thereof, it will be readily apparent to those skilled in the art that the present invention is not limited to these embodiments, and that various changes and modifications may be made without departing from the spirit of the invention or the scope of the appended claim.

We claim:

Dihydrorescinnamine, represented by the structural formula

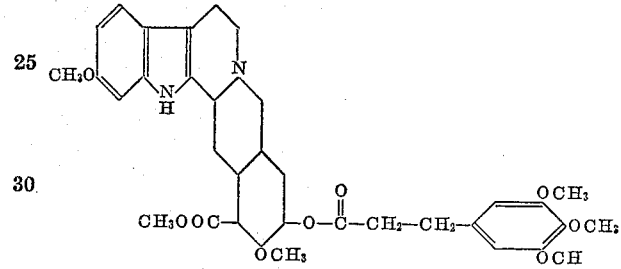

having a specific rotation $[\alpha]_D^{22} = -78°$ in chloroform solution, and a melting point of 176–177° C.

FOREIGN PATENTS 744,290     Great Britain _____ Feb. 1, 1956

OTHER REFERENCES

Groggins: Unit Processes in Org. Synth., 3rd. ed., 1947, McGraw-Hill, N. Y., pp. 500–501.

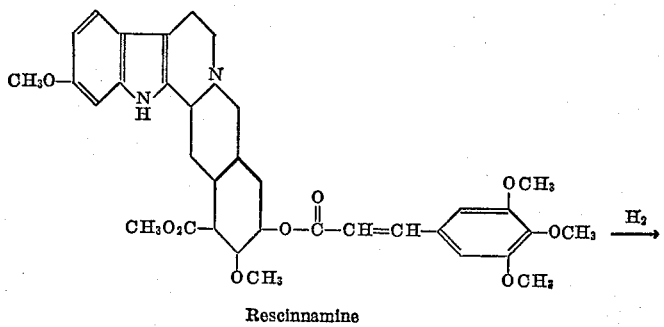

Rescinnamine

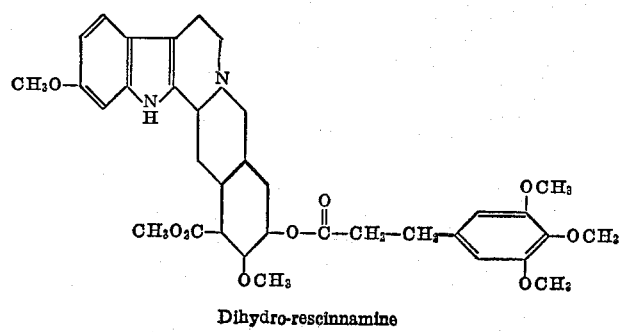

Dihydro-rescinnamine